United States Patent
Xu et al.

(10) Patent No.: US 12,204,043 B2
(45) Date of Patent: Jan. 21, 2025

(54) METHOD FOR EVALUATING PARAMETER OF INTERFERING SIGNAL AND DETECTION APPARATUS

(71) Applicant: Shenzhen Yinwang Intelligent Technologies Co., Ltd., Shenzhen (CN)

(72) Inventors: Leilei Xu, Shanghai (CN); Boya Qin, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 249 days.

(21) Appl. No.: 17/827,288

(22) Filed: May 27, 2022

(65) Prior Publication Data

US 2022/0291330 A1    Sep. 15, 2022

Related U.S. Application Data

(63) Continuation of application No. PCT/CN2020/132265, filed on Nov. 27, 2020.

(30) Foreign Application Priority Data

Nov. 28, 2019   (CN) .......................... 201911186342.6

(51) Int. Cl.
   *G01S 7/02*       (2006.01)
   *G01S 13/931*     (2020.01)

(52) U.S. Cl.
   CPC ............ *G01S 7/021* (2013.01); *G01S 7/0232* (2021.05); *G01S 7/0235* (2021.05); *G01S 13/931* (2013.01)

(58) Field of Classification Search
   CPC ...... G01S 7/021; G01S 7/0235; G01S 7/0232; G01S 13/931; G01S 7/38
   See application file for complete search history.

(56) References Cited

U.S. PATENT DOCUMENTS

| | | | |
|---|---|---|---|
| 2007/0120731 | A1 | 5/2007 | Kelly et al. |
| 2013/0021196 | A1 | 1/2013 | Himmelstoss et al. |
| 2016/0146933 | A1* | 5/2016 | Rao ........................ G01S 13/583 342/132 |
| 2016/0291130 | A1* | 10/2016 | Ginsburg ................ G01S 13/32 |
| 2017/0363712 | A1 | 12/2017 | Kim |
| 2019/0293749 | A1 | 9/2019 | Itkin et al. |

(Continued)

FOREIGN PATENT DOCUMENTS

| | | |
|---|---|---|
| CN | 103698763 A | 4/2014 |
| CN | 105044687 A | 11/2015 |

(Continued)

OTHER PUBLICATIONS

Alland Stephen, et al, "Interference in Automotive Radar Systems: Characteristics, mitigation techniques, and current and future research," IEEE Signal Processing Magazine, IEEE, USA, vol. 36, No. 5, Sep. 1, 2019, XP011745494, 15 pages.

*Primary Examiner* — Olumide Ajibade Akonai
*Assistant Examiner* — Yonghong Li
(74) *Attorney, Agent, or Firm* — Conley Rose, P.C.

(57) ABSTRACT

A method for evaluating a parameter of an interfering signal includes: determining a slope of an interfering signal; setting the slope of the interfering signal as a slope of a first transmission signal; and determining a parameter of the interfering signal based on a feature of an echo signal of the first transmission signal.

20 Claims, 7 Drawing Sheets

(56) References Cited

U.S. PATENT DOCUMENTS

2019/0317187 A1    10/2019   Meissner et al.
2019/0391247 A1*  12/2019   Gulati .................. G01S 7/0232
2020/0393536 A1*  12/2020   Stettiner .............. G01S 13/343

FOREIGN PATENT DOCUMENTS

| | | |
|---|---|---|
| CN | 107526062 A | 12/2017 |
| EP | 3306339 A1 | 4/2018 |
| IN | 109738872 A | 5/2019 |
| WO | 2019106656 A1 | 6/2019 |

\* cited by examiner

METHOD FOR EVALUATING PARAMETER OF INTERFERING SIGNAL AND DETECTION APPARATUS

CROSS-REFERENCE TO RELATED APPLICATIONS

This is a continuation of International Patent Application No. PCT/CN2020/132265 filed on Nov. 27, 2020, which claims priority to Chinese Patent Application No. 201911186342.6 filed on Nov. 28, 2019. The disclosures of the aforementioned applications are hereby incorporated by reference in their entireties.

TECHNICAL FIELD

This disclosure relates to the field of autonomous driving, and in particular, to a method for evaluating a parameter of an interfering signal and a detection apparatus.

BACKGROUND

As automotive safety standards become higher, the market of advanced driver assistance systems (ADAS) has come into being. A vehicle-mounted millimeter wave radar is a standard and a main sensor of a vehicle-mounted sensor system. According to investigations, more than 200 million users of vehicle-mounted millimeter wave radars increase each year, such that most frequencies related to the 24 gigahertz (GHz) spectrum and the 76 GHz to 81 GHz spectrum are occupied. The increasing use of in vehicle radars leads to an increase in a probability of mutual interference between radars. This greatly reduces a radar detection probability or increases a false radar alarm probability, and has non-negligent impact on safety or comfort of vehicles. In addition, a standardized cooperative organization of the vehicle-mounted radar has not yet formed, waveforms of vehicle radars are not coordinated. This may result in formation of a false target or interference signal intensity enhancement.

An existing anti-interference method includes interference avoidance. The interference avoidance method is to enable a transmission signal to avoid an interfering signal in frequency domain or time domain by estimating a parameter of the interfering signal, so as to improve a target detection success rate. In a current method for evaluating a parameter of an interfering signal, after an interfering signal falls into a non-ideal filter, an interfering time is short and unstable. Therefore, if a parameter of an interfering signal needs to be precisely estimated, a large quantity of samples is useful. Consequently, a long time needs to be consumed and motivation is poor.

Therefore, how to quickly and precisely estimate a parameter of an interference signal becomes an urgent problem to be resolved.

SUMMARY

This disclosure provides a method for evaluating a parameter of an interfering signal. This disclosure also provides a detection apparatus to quickly and precisely estimate a parameter of an interfering signal, so as to perform interference avoidance on the interfering signal.

According to a first aspect, a method for evaluating a parameter of an interfering signal is provided. The method includes determining a first slope of an interfering signal, transmitting a first transmission signal using the first slope as a second slope of the first transmission signal, receiving a first echo signal of the first transmission signal, and determining a parameter of the interfering signal based on the first echo signal.

In the foregoing technical solution, the first slope of the interfering signal is used as the second slope of the first transmission signal, so that all interfering signals fall into a filter, and an interference time in interfering echo signals with a same slope is long and stable. Therefore, a favorable condition for accurate estimation on the parameter of the interfering signal is provided.

With reference to the first aspect, in some implementations of the first aspect, determining the first slope of the interfering signal includes transmitting a second transmission signal, where a third slope of the second transmission signal is different from the first slope of the interfering signal, receiving a second echo signal of the second transmission signal, determining an interference duration of the interfering signal on the second transmission signal based on the second echo signal, determining a first candidate slope and a second candidate slope based on the interference duration, sending a third transmission signal by using the first candidate slope as a fourth slope of the third transmission signal, receiving a third echo signal of the third transmission signal, and further determining the first slope in the first candidate slope and the second candidate slope based on a feature of the third echo signal of the third transmission signal.

In the foregoing technical solution, the first slope of the interfering signal can be quickly determined based on the feature of the third echo signal of the third transmission signal.

With reference to the first aspect, in some implementations of the first aspect, the first transmission signal, the second transmission signal, and the third transmission signal are frequency-modulated continuous waves (FMCWs).

With reference to the first aspect, in some implementations of the first aspect, determining the parameter of the interfering signal based on the first echo signal includes determining an interference duration of the interfering signal on the first transmission signal based on the first echo signal, and determining a bandwidth of the interfering signal based on the first slope and the interference duration.

In the foregoing technical solution, the bandwidth of the interfering signal can be precisely estimated based on interference duration of an interfering signal in echo signals.

With reference to the first aspect, in some implementations of the first aspect, a carrier of a to-be-transmitted signal is adjusted based on the bandwidth of the interfering signal.

In the foregoing technical solution, precise frequency domain avoidance is performed based on the bandwidth of the interfering signal.

With reference to the first aspect, in some implementations of the first aspect, determining the parameter of the interfering signal based on the first echo signal includes determining a collision periodicity of the interfering signal and the first transmission signal based on the first echo signal, and determining a periodicity of the interfering signal based on a periodicity of the first transmission signal and the collision periodicity.

In the foregoing technical solution, the periodicity of the interfering signal can be precisely estimated based on a collision periodicity of an interfering signal and a transmission signal in echo signals.

With reference to the first aspect, in some implementations of the first aspect, the interference duration of the interfering signal on the first transmission signal is determined based on the first echo signal, and a transmission time of a to-be-transmitted signal is adjusted based on the periodicity of the interfering signal and the first interference duration.

In the foregoing technical solution, precise time domain avoidance is performed based on the periodicity of the interfering signal and the interference duration.

According to a second aspect, a detection apparatus is provided. The detection apparatus is configured to perform the method according to any one of the first aspect and the possible implementations of the first aspect. Further, the detection apparatus may include modules configured to perform the method according to any implementation of the first aspect and the possible implementations of the first aspect, for example, include a processing module and a transceiver module. For example, the detection apparatus is a radar detection apparatus. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function.

For technical effects brought by the second aspect or the possible implementations of the second aspect, refer to the descriptions of the technical effects of the first aspect or the implementations of the first aspect. Details are not described again.

According to a third aspect, a detection apparatus is provided. The detection apparatus includes a processor which may be configured to perform the method according to any one implementation of the first aspect and the possible implementations of the first aspect. Optionally, the detection apparatus further includes a memory, and the processor is coupled to the memory. Optionally, the detection apparatus further includes a communication interface, and the processor is coupled to the communication interface.

In an implementation, the detection apparatus is a radar detection device. When the detection apparatus is a radar detection device, the communication interface may be a transceiver or an input/output interface.

In another implementation, the detection apparatus is a chip or a chip system. When the communication apparatus is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a fourth aspect, a processor is provided, and includes an input circuit, an output circuit, and a processing circuit. The processing circuit is configured to receive a signal by using the input circuit and transmit a signal by using the output circuit, so that the method according to any one of the first aspect and the possible implementations of the first aspect is implemented.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this disclosure.

According to a fifth aspect, a processing apparatus is provided, and includes a processor and a memory. The processor is configured to read instructions stored in the memory, receive a signal by using a receiver, and transmit a signal by using a transmitter, to perform the method according to any one of the first aspect and the possible implementations of the first aspect.

Optionally, there are one or more processors, and there are one or more memories.

Optionally, the memory may be integrated with the processor, or the memory and the processor are disposed separately.

In a specific implementation process, the memory may be a non-transitory memory such as a read-only memory (ROM). The memory and the processor may be integrated on a same chip, or may be separately disposed on different chips. A type of the memory and a manner of disposing the memory and the processor are not limited in this embodiment of this disclosure.

It should be understood that, a related data exchange process such as sending of indication information may be a process of outputting the indication information from the processor, and receiving of capability information may be a process of receiving the input capability information by the processor. Further, data output by the processor may be output to a transmitter, and input data received by the processor may be from a receiver. The transmitter and the receiver may be collectively referred to as a transceiver.

The processor according to the fifth aspect may be a chip. The processor may be implemented using hardware or software. When the processor is implemented using hardware, the processor may be a logic circuit, an integrated circuit, or the like. When the processor is implemented using software, the processor may be a general-purpose processor, and is implemented by reading software code stored in the memory. The memory may be integrated into the processor, or may exist independently outside the processor.

According to a sixth aspect, a computer program product is provided. The computer program product includes a computer program (or a code or an instruction). When the computer program is run, a computer is enabled to perform the method according to any one of the first aspect to the third aspect and the possible implementations of the first aspect to the third aspect.

According to a seventh aspect, a computer-readable storage medium is provided. The computer-readable storage medium stores a computer program (or a code or instructions). When the computer program is run on a computer, the computer is enabled to perform the method according to any one implementation of the first aspect and the possible implementations of the first aspect.

According to an eighth aspect, a system is provided, including the foregoing radar detection device.

According to a ninth aspect, a vehicle, for example, a smart vehicle, is provided and includes the detection apparatus according to the second aspect or the third aspect, and/or the processor according to the fourth aspect, and/or the processing apparatus according to the fifth aspect, and/or the chip according to the fifth aspect.

DESCRIPTION OF EMBODIMENTS

The following describes technical solutions of this disclosure with reference to the accompanying drawings.

Figure 1:
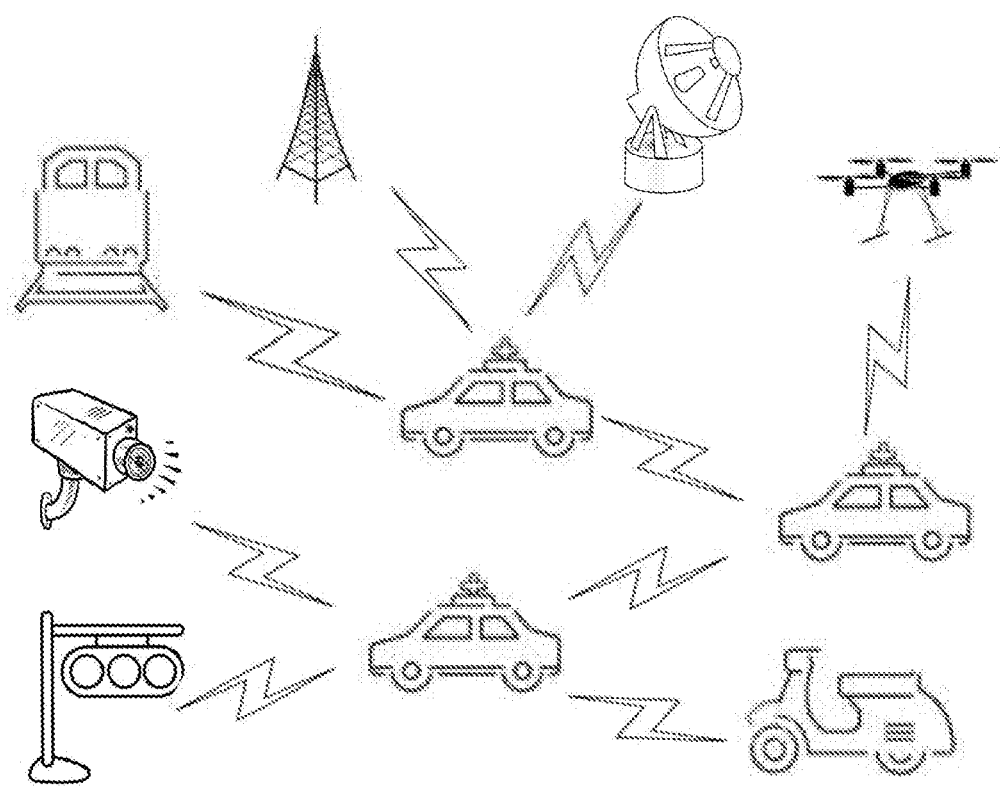
FIG. 1 is a schematic diagram of a possible application scenario to which an embodiment of this disclosure is applicable.

FIG. 1 is a schematic diagram of a possible application scenario according to an embodiment of this disclosure. A system in the application scenario includes one or more radar apparatuses and a target apparatus interacting with the one or more radar apparatuses. This disclosure is mainly applied to a vehicle-mounted radar system. This disclosure may also be applied to another radar system, provided that mutual interference between radar signals exists in the system.

A radar is an electronic device using electromagnetic waves to detect a target, and may also be referred to as a radar apparatus, a detector, or a detection apparatus. A working principle of the radar is that the radar transmits an electromagnetic wave (or a transmission signal or a detection signal) to the target through a transmitter, and a radar receiver receives a reflected signal reflected by the target object and displays an echo signal of the reflected signal on a radar display to obtain information such as a distance between the target and an electromagnetic wave transmission point, a distance change rate (radial velocity), an azimuth, and an altitude.

As shown in FIG. 1, the radar may be installed on a motor vehicle, an unmanned aerial vehicle, a track car, a bicycle, a signal light, a speed measurement apparatus, a network device (e.g., a base station or a terminal device in various systems), or the like. This disclosure is applicable to not only a radar system between vehicles, but also a radar system between a vehicle and another apparatus such as an unmanned aerial vehicle, or a radar system between other apparatuses. An installation location and a function of the radar are not limited in this disclosure.

FMCWs are the most commonly used waveforms applied to vehicles in a radar system. Therefore, a probability of mutual interference between the FMCWs is very high.

Existing FMCW anti-interference methods mainly include an interference detection method, an interference suppression method, a signal reconstruction method, and an interference avoidance method. The interference avoidance method mainly includes a time domain interference avoidance method and a frequency domain interference avoidance method. Time domain interference avoidance is to receive an interfering signal, estimate a valid time of the interfering signal based on a silent time, and perform avoidance in a time dimension. Existing frequency domain interference avoidance methods include random frequency hopping in a limited bandwidth, estimating a center frequency of an interfering signal for frequency hopping, and estimating a bandwidth of the interfering signal for frequency hopping.

Figure 2:
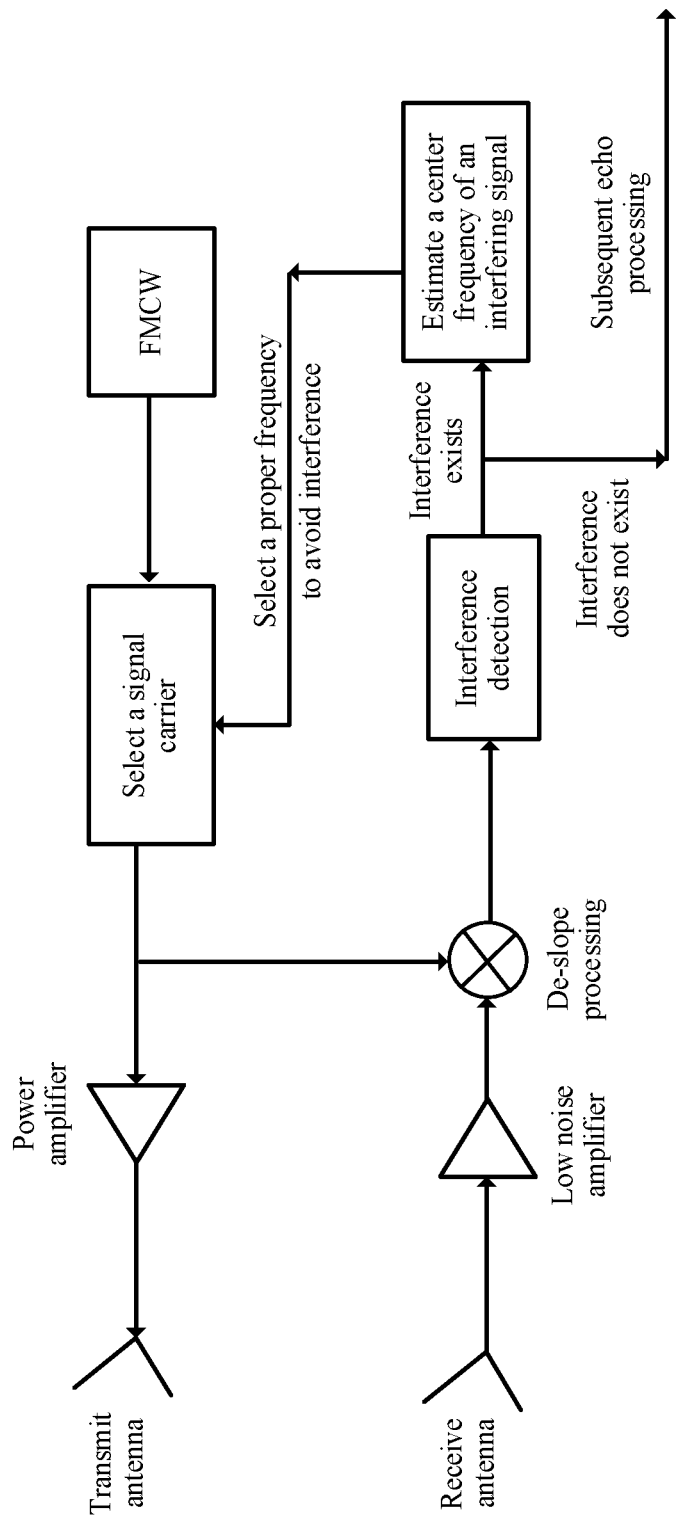
FIG. 2 is a schematic block diagram of estimating a center frequency of an interfering signal in a current FMCW radar system.

In FIG. 2, an example in which a center frequency of an interfering signal is estimated is useful to describe an interference parameter estimation method in a current FMCW radar system.

(1) A radar transmitter transmits a source signal. A radar receiver receives a reflected signal and an interfering signal. The reflected signal and the interfering signal pass through a filter together. An echo signal formed by the reflected signal and the interfering signal is displayed on a radar display.

(2) A de-slope processing module mixes echo signals using a transmission signal.

(3) An interference detection module detects an interfering signal based on a baseband signal obtained after de-slope processing and using a time domain detection method.

(4) A center frequency of the interfering signal is estimated based on a detected interference sample (where the estimation method is similar to finding the center of mass of an object), and a formula of calculating the center frequency of the interfering signal $\hat{r}$ is:

$$\hat{r} = \frac{1}{N_{int}} \sum_{i=1}^{N_{int}} \frac{S_i}{N},$$

where N is a total quantity of sampling points in a valid time, $N_{int}$ is a total quantity of interference sampling points, and $s_i$ is an $i^{th}$ interference sample.

(5) A proper FMCW carrier is selected based on the estimated center frequency of the interfering signal and a position at which interference appears in a chirp to avoid the interfering signal.

Figure 3:
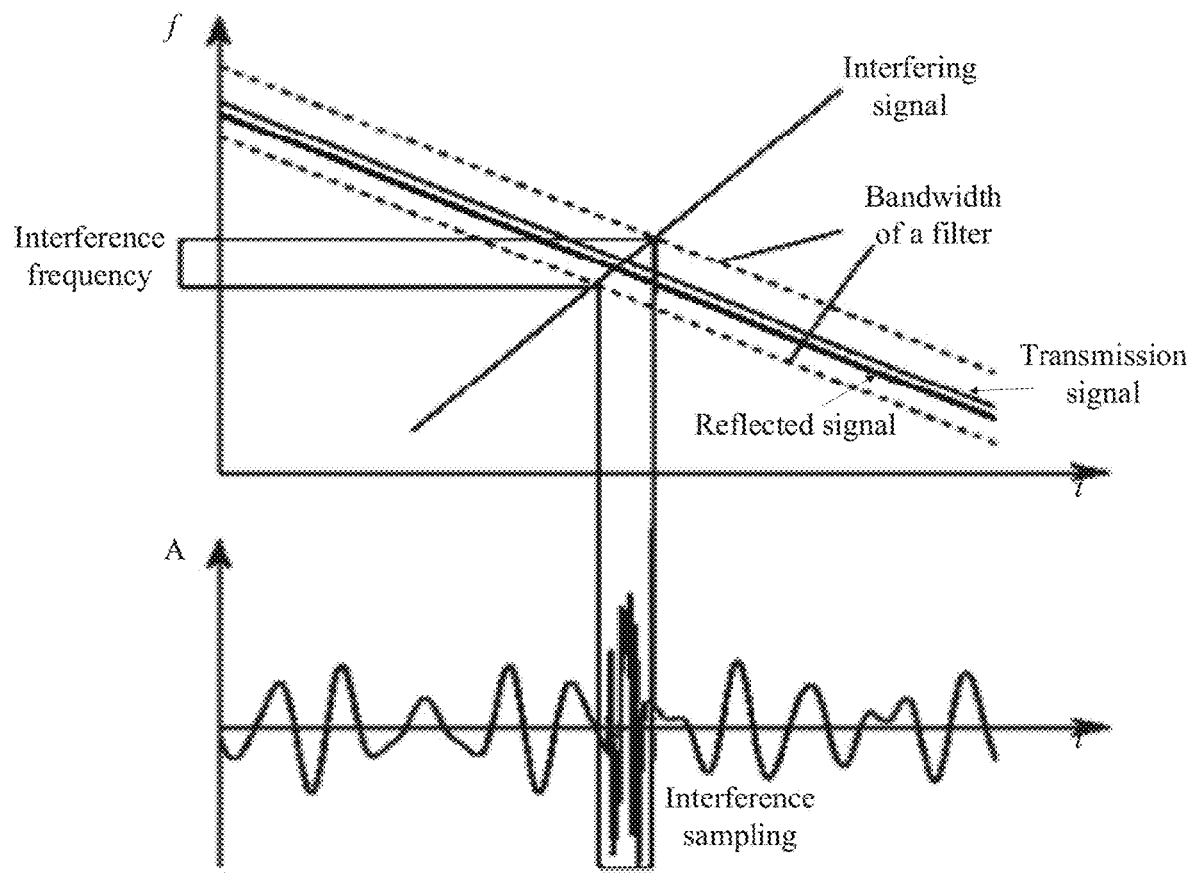
FIG. 3 is a time-frequency comparison chart of FMCW interference.

FIG. 3 shows that when receiving a reflected signal of a transmission signal (where slopes of the reflected signal and the transmission signal are the same), a radar also receives an interfering signal. The slope of the reflected signal is different from that of the interfering signal. Therefore, when reflected signals pass through a filter, all the reflected signals fall into a bandwidth of the filter, while only some interfering signals fall into the bandwidth of the filter, that is, a frequency bandwidth corresponding to an interference frequency in FIG. 3. These interfering signals falling into the bandwidth of the filter interfere with the reflected signals, and an interfering signal that has not fallen into the bandwidth of the filter does not interfere with the reflected signals. As shown by FIG. 3, duration of a bandwidth of the interfering signal falling into the filter is short in corresponding time domain. Therefore, interference duration of an echo signal displayed on a radar display is short and unstable. In the interference parameter estimation method shown in FIG. 2, the parameter of the interfering signal is estimated by collecting a large quantity of interference samples in time domain. A long time is consumed, motivation is poor, and it is difficult to accurately estimate the parameter of the interfering signal.

In view of this, embodiments of this disclosure provide a method for evaluating a parameter of an interfering signal to precisely estimate a parameter of an interfering signal, so as to precisely perform interference avoidance to completely eliminate interference of the interfering signal with a radar system.

Embodiments provided in this disclosure are described in detail below with reference to the accompanying drawings.

By way of example rather than limitation, the following embodiment is described based on a single-transmit and single-receive radar system. For example, a transmission signal and an interfering signal are both FMCWs. The following embodiment can also applied to a multi-station radar system such as a multiple-input multiple-output (MIMO) system. For the multi-station radar system, parameters of a plurality of interfering signals may be estimated by using an implementation of the method provided in this disclosure.

Figure 4:
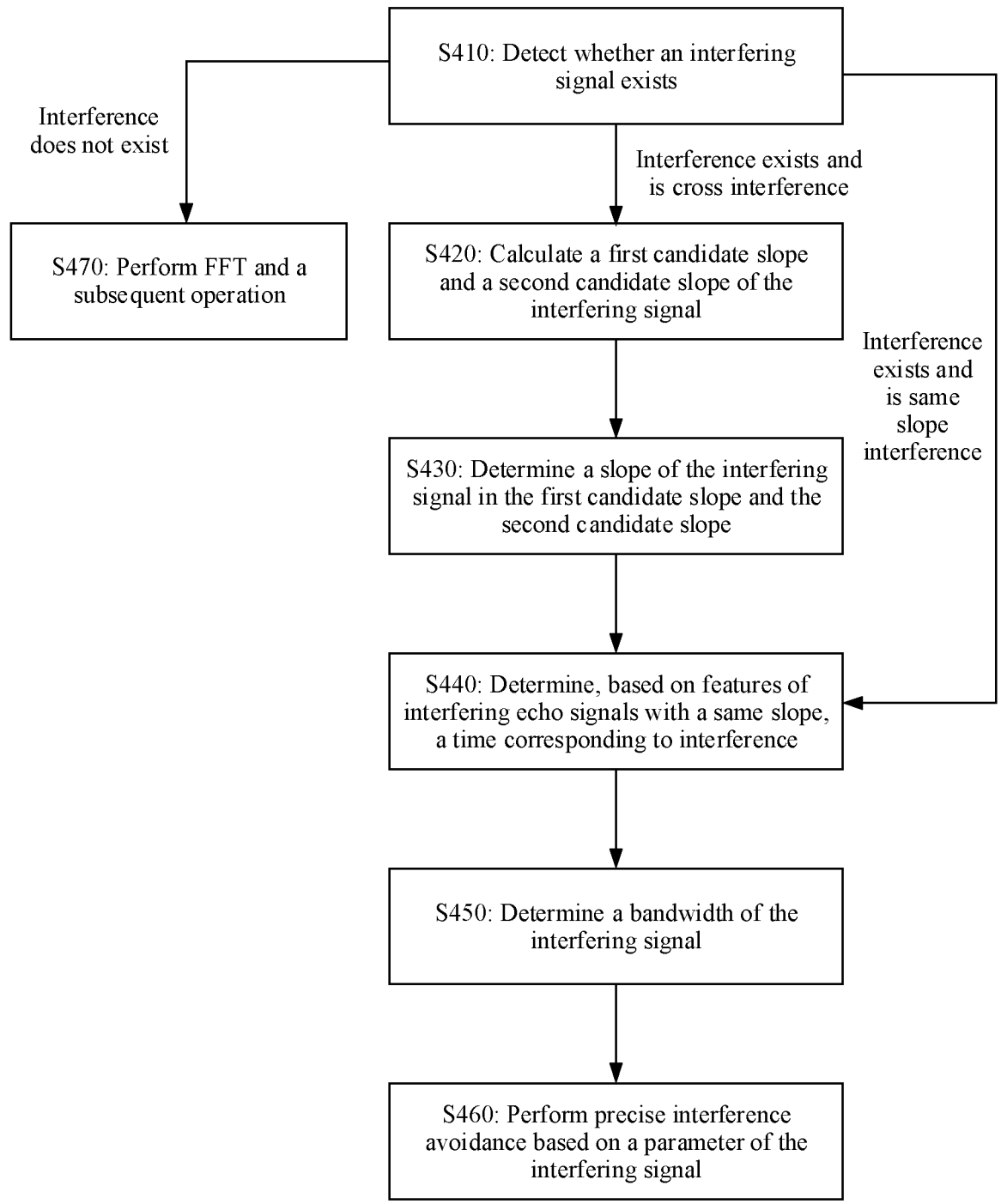
FIG. 4 is a schematic flowchart of estimating a parameter of an interfering signal according to an embodiment of this disclosure.

FIG. 4 is a schematic flowchart of estimating a parameter of an interfering signal according to an embodiment of this disclosure. The method may include the following steps.

Step S410 includes detecting, based on an echo signal of a second transmission signal, whether an interfering signal exists.

Figure 5:
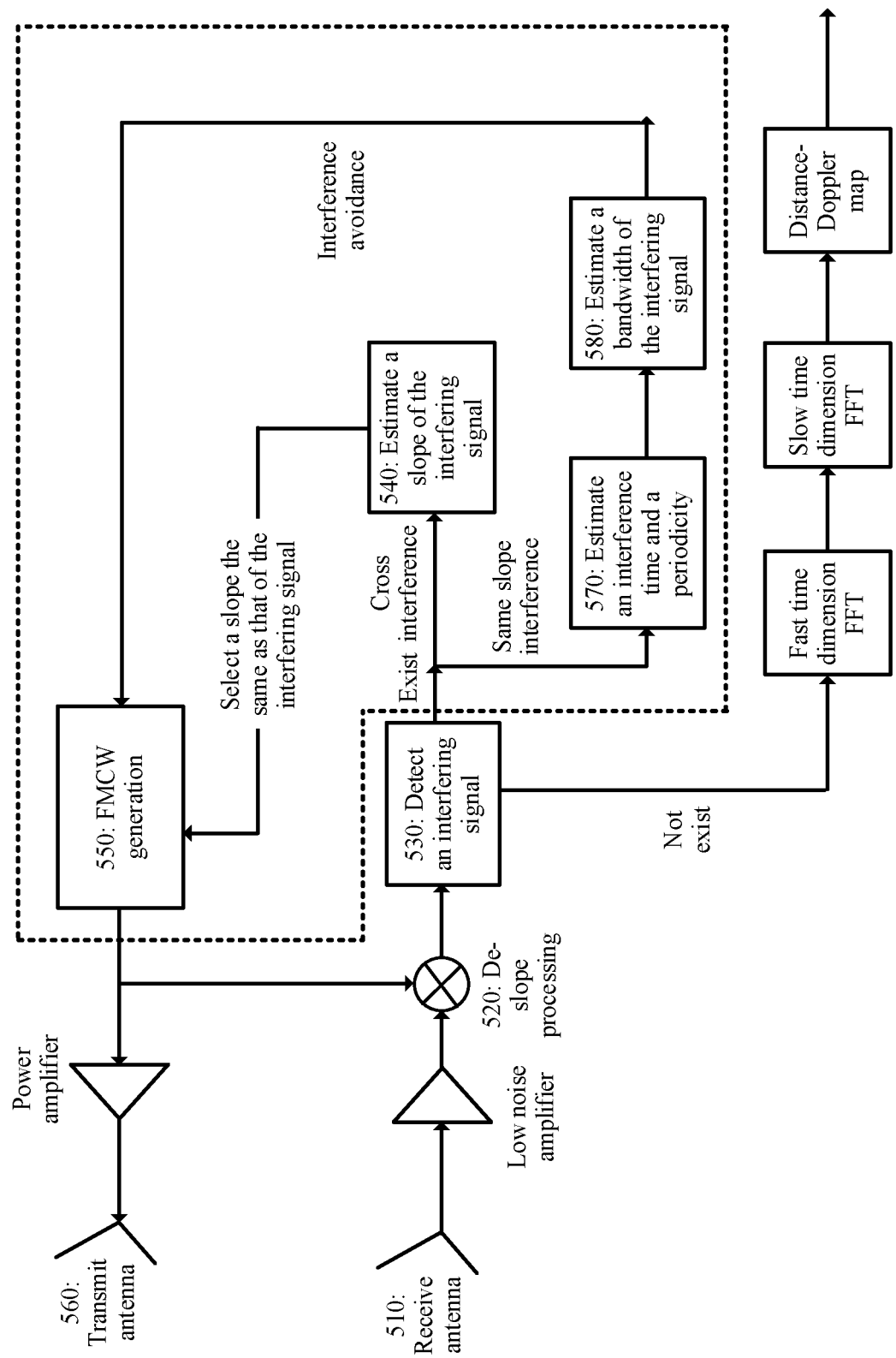
FIG. 5 is a schematic block diagram of estimating a parameter of an interfering signal according to an embodiment of this disclosure.

A radar detection device transmits the second transmission signal through a transmit antenna 560 shown in FIG. 5, and receives the echo signal of the second transmission signal through the receive antenna 510 after a period of time.

A de-slope processing module 520 mixes the echo signal of the second transmission signal by using the second transmission signal. An interfering signal detection module 530 detects, based on a time domain detection method, whether the interfering signal exists and whether interference is cross interference. A feature of the cross slope interference is that an amplitude fluctuation frequency of the echo signal changes with time.

Optionally, the time domain detection method includes a time domain energy detection method and a time domain differential method. An interfering signal detection method is not limited in this disclosure.

If it is detected that the interfering signal exists and the interference is cross interference, step S420 is performed.

If it is detected that the interfering signal exists and the interference is same slope interference, step S440 is performed.

If no interfering signal is detected, step S470 is performed.

Step S420 includes calculating a first candidate slope and a second candidate slope of the interfering signal.

The interfering signal detection module 530 detects that the interference is the cross interference. An interfering signal slope estimation module 540 determines second interference duration T0 in the echo signal of the second transmission signal, and calculate an interference slope based on a formula $T0=2Bs/|S_2-S_1|$, where Bs is a bandwidth of a receiver, and $S_2$ and $S_1$ are respectively a slope of an interfering signal and a slope of a transmission signal. The slope $S_2$ of the interfering signal calculated by using the formula has two candidate slopes (where because S2−S1 may have two values: a positive value and a negative value, $S_2$ has two candidate values).

It should be understood that the second interference duration is duration of interference of the interfering signal with the second transmission signal when the interfering signal passes through a filter.

It should be understood that the foregoing formula is applicable to the case of the interfering signal shown in FIG. 3, to be specific, a part of bandwidth of the interfering signal completely falls into the filter. If only a half of the bandwidth, shown in FIG. 3, of the interfering signal falling into the filter falls into the filter, a corresponding interference time T0' is T0/2. In this case, the interference slope, that is, $T0'=(\frac{1}{2})*2Bs/|S_2-S_1|$, is calculated based on a proportion of the interfering signal falling into the filter.

Any one of the two candidate slopes can be selected as a slope of a third transmission signal. For example, the first candidate slope is selected as the slope of the third transmission signal, and then step S430 is performed.

Step S430 includes determining the slope of the interfering signal in the first candidate slope and the second candidate slope.

The slope of the third transmission signal is adjusted, based on an FMCW generation module 550, as the first candidate slope selected in step S420. The FMCW generation module 550 may set any two of a bandwidth, a time, and a slope of an FMCW.

Optionally, the third transmission signal is a next chirp or a next frame of transmission signal of the second transmission signal.

A radar transmits the third transmission signal through the transmit antenna 560, and receives an echo signal of the third transmission signal through the receive antenna 510 after a period of time.

The radar determines, based on a feature of the echo signal of the third transmission signal, which one of the first candidate slope and the second candidate slope is the slope of the interfering signal.

If it is still a feature of cross slope interference in the echo signal, in other words, an amplitude fluctuation frequency of the echo signal changes with time, the slope of the interfering signal is the second candidate slope, the second candidate slope is selected as the slope of the first transmission signal, and then, step S440 is performed.

Optionally, the first transmission signal is a next chirp or a next frame of transmission signal of the third transmission signal.

If the amplitude fluctuation frequency of the echo signal does not change with time, the first candidate slope is selected as the slope of the interfering signal, and step S440 is performed.

Step S440 includes determining, based on features of interfering echo signals with a same slope, a time corresponding to interference.

Figure 6:
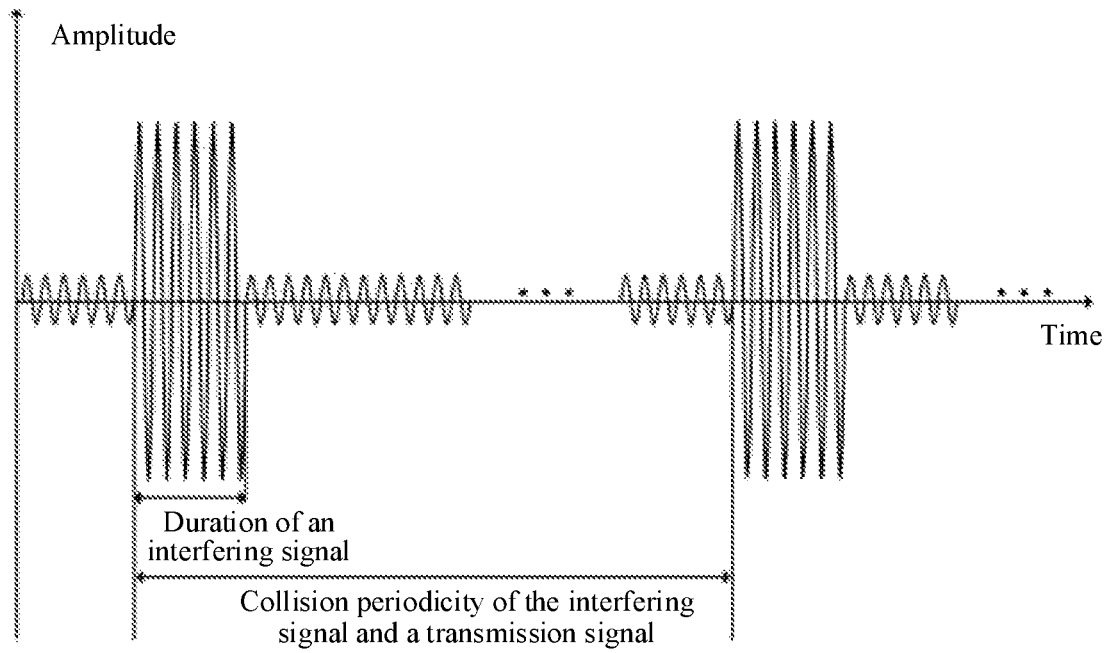
FIG. 6 is a schematic diagram of interference effects of a same slope according to an embodiment of this disclosure.

An interference time and periodicity estimation module 570 determines interference duration T1 in interfering echo signals and/or a collision periodicity T2 of an interfering signal and a transmission signal based on time domain features of the interfering echo signals with a same slope shown in FIG. 6.

As shown by FIG. 6, features of amplitudes of the echo signals change with time. In a period of time, the amplitudes of the echo signals change greatly. This period of time is the interfering signal duration T1 shown in FIG. 6. A period of time from a start time point at which the amplitudes of the echo signals change greatly to a next start time point at which the amplitudes change greatly is the collision periodicity T2 of the interfering signal and the transmission signal shown in FIG. 6. In addition, a least common multiple of a periodicity of the transmission signal and a periodicity T of the interfering signal is the collision periodicity T2 of the interfering signal and the transmission signal. Therefore, after the collision periodicity T2 is determined from FIG. 6, because the transmission signal is known, the periodicity of the interfering signal T can be inferred.

For example, when the second candidate slope is the slope of the interfering signal, the first interference duration in the echo signals of the first transmission signal and/or the collision periodicity of the interfering signal and the transmission signal may be directly obtained based on time domain features of interference effects with a same slope.

Because the periodicity of the transmission signal is known, the interference time and periodicity estimation module 570 can infer the periodicity T of the interfering signal based on the periodicity of the first transmission signal and the collision periodicity of the first transmission signal and the interfering signal. For example, if the periodicity of the transmission signal is 40 microseconds (μs) and the collision periodicity T2 is 360 μs, the periodicity of the interfering signal is 360/40=90 μs.

Step S450 includes determining a bandwidth B of the interfering signal.

The interfering signal bandwidth estimation module 580 calculates the bandwidth B of the interfering signal based on the slope k of the interfering signal determined in step S430 and the interfering signal duration T1 obtained in step S440, where B=k*T1.

Step S460 includes performing precise interference avoidance based on a parameter of the interfering signal.

A carrier of a to-be-transmitted signal is adjusted based on the FMCW generation module 550 and the estimated bandwidth B of the interfering signal to implement frequency domain interference avoidance. For example, if the carrier of the to-be-transmitted signal is $f_0$, the carrier of the to-be-transmitted signal may be adjusted as $f_0 \pm B$ to perform frequency domain avoidance.

Optionally, based on the estimated periodicity T of the interfering signal and the interference duration T1, a start time of a chirp transmission pulse is adjusted at a moment at which the to-be-transmitted signal collides with the interfering signal to perform time domain avoidance.

After interference avoidance is implemented by adjusting the parameters, the adjusted carrier and/or a to-be-transmitted signal of a start transmission time are transmitted. After an echo signal of the transmission signal passes through the de-slope processing module 520, the echo signal enters the interfering signal detection module 530. In this case, it is displayed after detection that there is no interfering signal, and step S470 is performed.

Step S470 includes performing a fast Fourier transform (FFT) and subsequent signal processing.

The FFT is a method for quickly calculating a discrete Fourier transform (DFT) or inverse transform of a sequence. Fourier analysis converts a signal from an original domain (usually time or space) to a representation of frequency domain or vice versa.

When the interfering signal detection module 530 has not detected any interfering signal in the echo signals, an FFT operation is performed on the echo signals in a fast time dimension, then, an FFT operation is performed on the echo signals in a slow time dimension to obtain a distance-Doppler map, and next, a subsequent operation, for example, incoherent accumulation or parameter estimation, may be performed.

Based on the foregoing technical solution, the parameter of the interfering signal can be precisely estimated within a short period of time (where the estimation can be implemented in two neighboring chirps in an ideal situation). A "same slope interference" effect is achieved by actively adjusting a slope of a transmission signal. Same slope interference means that when the slope of the transmission signal is the same as that of the interfering signal, all interfering signal fall into a valid bandwidth of a receiver, so that interference duration of an interfering in echo signals is long and stable. A feature and a parameter of the interfering signal can be better estimated by applying the same slope interference. This lays a foundation for accurate estimation on a subsequent parameter of the interfering signal, and further provides a strong support for precise interference avoidance to completely eliminate interference.

FIG. 5 is a schematic block diagram of estimating a parameter of an interfering signal according to an embodiment of this disclosure. In at least one embodiment, FIG. 5 and FIG. 4 are exactly the same in terms of implementation processes. Specific steps of a parameter estimation method are not described herein. The following briefly describes functions of modules in FIG. 5.

A transmit antenna 560 and a receive antenna 510 are devices configured to transmit and receive electromagnetic waves and determine detection directions of the electromagnetic waves. During transmission, a radar needs to radiate energy to a direction that needs to be irradiated. During reception, the radar should receive echoes only in a detection direction. Among three coordinates (an azimuth, an elevation, and a distance) of a target position that are measured by the radar, measurement of two coordinates (the azimuth and the elevation) is directly related to performance of an antenna. Therefore, the performance of the antenna is more important for a radar device than for another electronic device (such as a communication device).

A de-slope processing module 520 is configured to perform signal processing, such as mixing, filtering, and amplification, on a receiving signal and a transmission signal of the radar. Further, the signal processing involves processing such as analog filtering, amplification, digitization, digital filtering, storage, and transmission of a de-slope signal.

An interfering signal detection module 530 is configured to detect, based on a time domain detection method, whether an interfering signal exists in echo signals; and determine a subsequent signal processing method based on whether the interfering signal exists in the echo signals.

An interfering signal slope estimation module 540 is configured to calculate two candidate slopes of the interfering signal based on interference duration in the echo signals; and determine an actual slope of the interfering signal in the two candidate slopes.

A slope of a transmission signal is subsequently adjusted as the slope of the interfering signal by using the module, to implement "same slope interference" and provide a foundation for estimating a parameter of the interfering signal.

An FMCW generation module 550 is configured to set any two of a bandwidth, a time, and a slope of an FMCW.

An interference time and periodicity estimation module 570 is configured to determine duration of the interfering signal and a collision periodicity of the interfering signal and the transmission signal based on time domain features of echo signals with "same slope interference", and then determine a periodicity of the interfering signal based on a periodicity of the transmission signal and the collision periodicity.

The periodicity and the interference duration of the interfering signal are determined by using the module. The FMCW generation module may adjust pulse start time of the transmission signal to avoid the interfering signal in time domain.

An interfering signal bandwidth estimation module 580 is configured to calculate a bandwidth of the interfering signal based on a formula B=k*T1, where k is the slope of the interfering signal, and T1 is interference duration in the echo signals with "same slope interference".

The bandwidth of the interfering signal is determined by using the module. The FMCW generation module may adjust a carrier of the transmission signal to avoid the interfering signal in frequency domain.

The interference avoidance includes time domain interference avoidance and/or frequency domain interference avoidance. Therefore, when only the time domain avoidance is performed, the interfering signal bandwidth estimation module 580 is an optional module.

It may be understood that the methods and operations implemented by the radar detection device in the foregoing method embodiments may alternatively be implemented by a component (e.g., a chip or a circuit) that may be used in the radar detection device. In a possible implementation, the foregoing interfering method for evaluating a method of an interfering signal is implemented by a processor relatively independent of the radar. The processor may be integrated inside or outside the radar apparatus. After the related parameters of the interfering signal are determined according to the foregoing method, the related parameters are sent to the radar apparatus, so that the radar apparatus better performs interference avoidance during target detection. In another possible implementation, the method for evaluating a parameter of an interfering signal is implemented by a fusion module. The fusion module may determine a parameter of an interfering signal from at least one sensor, and further, may comprehensively determine a parameter value of the interfering signal. In other words, the method for evaluating a parameter of an interfering signal may be implemented in combination with a specific product form.

The foregoing describes the method embodiments provided in this disclosure, and the following describes apparatus embodiments provided in this disclosure. It should be understood that descriptions of the apparatus embodiments correspond to the descriptions of the foregoing method embodiments. Therefore, for content not described in detail, refer to the foregoing method embodiments. For brevity, details are not described herein again.

Figure 7:
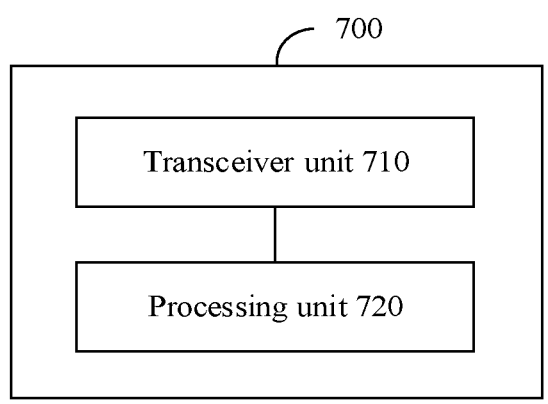
FIG. 7 is a schematic block diagram of a detection apparatus according to an embodiment of this disclosure.

The solutions provided in embodiments of this disclosure are described mainly from a perspective of the detection apparatus, for example, from a perspective between the radar and the interfering signal or from a perspective of interaction between the radar and the target object. It may be understood that, to implement the foregoing functions, the detection apparatus includes corresponding hardware structures and/or software modules for performing the functions. A person skilled in the art should understand that, in combination with units and algorithm steps of the foregoing method embodiments, this disclosure can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this disclosure. FIG. 7 is a schematic block diagram of a detection apparatus according to an embodiment of this disclosure. The detection apparatus 700 includes a transceiver unit 710 and a processing unit 720. The transceiver unit 710 may communicate with devices external to the detection apparatus 700, and the processing unit 720 is configured to process data. The transceiver unit 710 may also be referred to as a communication interface or a communication unit.

Optionally, the detection apparatus 700 may further include a storage unit. The storage unit may be configured to store instructions and/or data. The processing unit 720 may read the instructions and/or data in the storage unit.

The detection apparatus 700 may be configured to perform the operations performed by the radar detection device in the foregoing method embodiments. In this case, the detection apparatus 700 may be a radar apparatus or a component that may be used for a radar detection device. The transceiver unit 710 is configured to perform the operations related to transmission and reception performed by the radar detection device in the foregoing method embodiments. The processing unit 720 is configured to perform the operations related to processing performed by the radar detection device in the foregoing method embodiment.

In an embodiment, the detection apparatus 700 is configured to perform the operations performed by the radar detection device in the embodiment shown in FIG. 4. The processing unit 720 is configured to determine a slope of an interfering signal. The transceiver unit 710 is configured to transmit a first transmission signal by using the slope of the interfering signal as a slope of the first transmission signal, and receive an echo signal of the first transmission signal. The processing unit 720 is configured to determine a parameter of the interfering signal based on the echo signal of the first transmission signal.

Optionally, the transceiver unit 710 is configured to transmit a second transmission signal, where a slope of the second transmission signal is different from the slope of the interfering signal, and receive an echo signal of the second transmission signal. The processing unit 720 is configured to determine second interference duration of the interfering signal on the second transmission signal based on the echo signal of the second transmission signal, determine a first candidate slope and a second candidate slope based on the second interference duration, and use the first candidate slope as a slope of a third transmission signal. The transceiver unit 710 is configured to send the third transmission signal, and receive an echo signal of the third transmission signal. The processing unit 720 is configured to determine the slope of the interfering signal in the first candidate slope and the second candidate slope based on a feature of the echo signal of the third transmission signal.

Optionally, the first transmission signal, the second transmission signal, and the third transmission signal are FMCWs.

Optionally, the processing unit 720 is configured to determine first interference duration of the interfering signal on the first transmission signal based on the echo signal of the first transmission signal, and determine a bandwidth of the interfering signal based on the slope of the interfering signal and the first interference duration.

Optionally, the processing unit 720 is configured to adjust a carrier of a to-be-transmitted signal based on the bandwidth of the interfering signal.

Optionally, the processing unit 720 is configured to determine a collision periodicity of the interfering signal and the first transmission signal based on the echo signal of the first transmission signal, and determine a periodicity of the interfering signal based on a periodicity of the first transmission signal and the collision periodicity.

Optionally, the processing unit 720 is configured to determine the first interference duration of the interfering signal on the first transmission signal based on the echo signal of the first transmission signal, and adjust a transmission time of the to-be-transmitted signal based on the periodicity of the interfering signal and the first interference duration.

The processing unit 720 in FIG. 7 may be implemented by using a processor or a processor-related circuit. The transceiver unit 710 may be implemented by using a transceiver or a transceiver-related circuit. The transceiver unit 710 may also be referred to as a communication unit or a communication interface. The storage unit may be implemented by using a memory.

Figure 8:
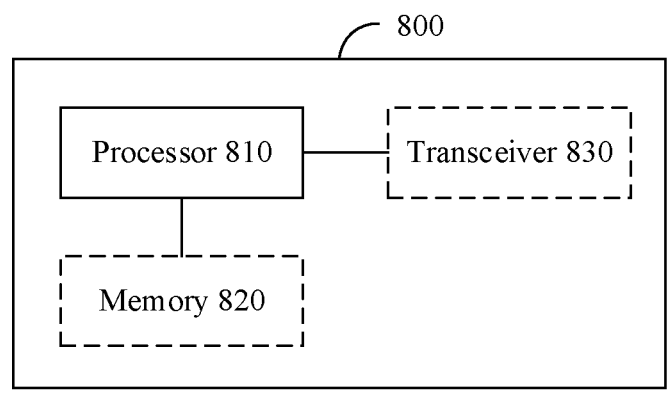
FIG. 8 is a schematic block diagram of another detection apparatus according to an embodiment of this disclosure.

As shown in FIG. 8, an embodiment of this disclosure further provides a detection apparatus 800. The detection apparatus 800 includes a processor 810. The processor 810 is coupled to a memory 820. The memory 820 is configured to store a computer program or instructions and/or data. The processor 810 is configured to execute the computer program or instructions and/or data stored in the memory 820, so that a method in accordance with the foregoing method embodiments is implemented.

Optionally, the detection apparatus further includes a communication interface, and the processor is coupled to the communication interface. The communication interface may be a transceiver or an input/output interface.

Optionally, the detection apparatus 800 includes one or more processors 810.

Optionally, as shown in FIG. 8, the detection apparatus 800 may further include the memory 820.

Optionally, the detection apparatus 800 may include one or more memories 820.

Optionally, the memory 820 may be integrated with or separated from the processor 810.

Optionally, as shown in FIG. 8, the detection apparatus 800 may further include a transceiver 830. The transceiver 830 is configured to receive and/or send a signal. For example, the processor 810 is configured to control the transceiver 830 to receive and/or send a signal.

In an embodiment, the detection apparatus 800 is configured to implement the operations performed by the radar detection device in the foregoing method embodiments.

For example, the processor 810 is configured to implement the operations related to processing performed by the radar detection device in the foregoing method embodiments, and the transceiver 830 is configured to implement the operations related to transmission and reception performed by the radar detection device in the foregoing method embodiments.

Figure 9:
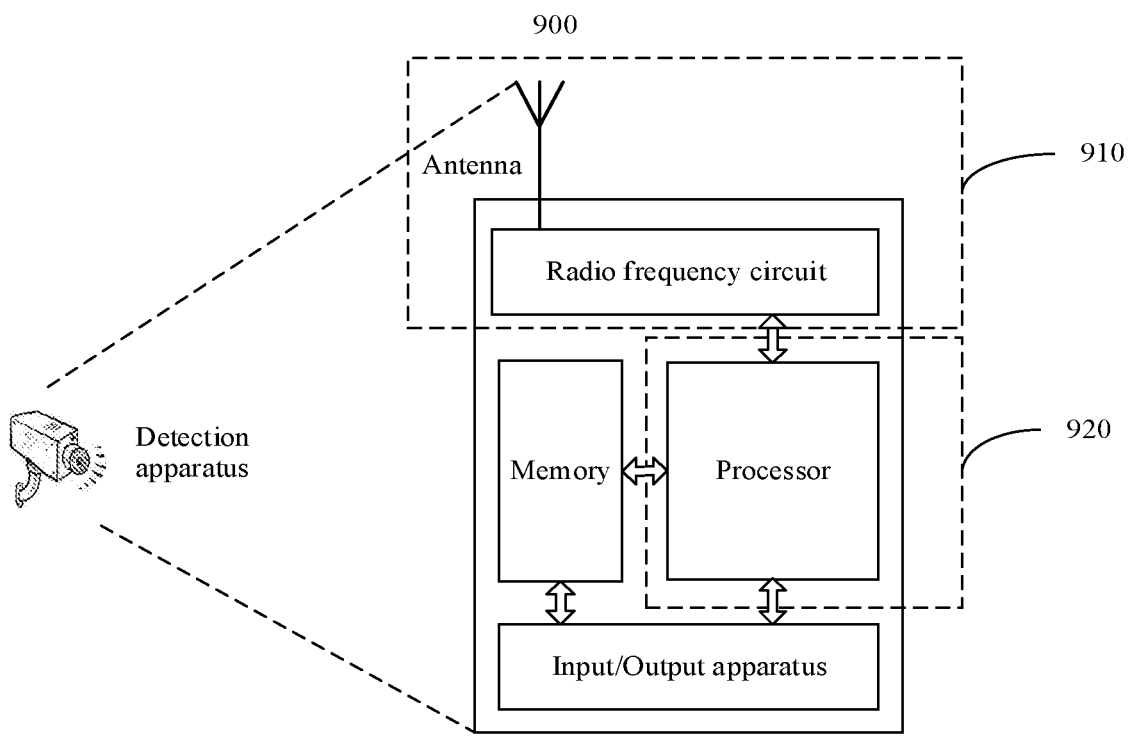
FIG. 9 is a schematic block diagram of a radar detection apparatus according to an embodiment of this disclosure.

In this optional manner, the detection apparatus includes a transmit antenna, a receive antenna, and a processor. Further, the detection apparatus includes a frequency mixer and/or an oscillator. Further, the detection apparatus may include a low-pass filter, a directional coupler, and/or the like. The transmit antenna is configured to support the detection apparatus in transmitting a radio signal and the receive antenna supports receiving a radio signal and/or a reflected signal to finally implement a detection function. The processor performs some possible determining and/or processing functions. Further, the processor controls operations of the transmit antenna and/or the receive antenna. Further, a signal that needs to be transmitted is transmitted by the processor by controlling the transmit antenna, and a signal received by using the receive antenna may be transmitted to the processor for corresponding processing. The components included in the detection apparatus may be configured to perform any one of the foregoing implementation solutions. Optionally, the detection apparatus may further include a memory, configured to store program instructions and/or data. The transmit antenna and the receive antenna may be independently disposed, or may be integrated and disposed as a transceiver antenna, to execute a corresponding transmit/receive function. An embodiment of this disclosure further provides a detection apparatus 900. The detection apparatus 900 may be a radar detection device or a chip. The detection apparatus 900 may be configured to perform the operations performed by the radar detection device in the foregoing method embodiments. When the detection apparatus 900 is a radar detection device, FIG. 9 is a schematic diagram of a structure of a simplified detection apparatus. As shown in FIG. 9, the detection apparatus includes a processor, a memory, a radio frequency circuit, an antenna, and an input/output apparatus. The processor is configured to process communication data, control the detection apparatus, execute a software program, and process data of the software program and the like. The memory is configured to store the software program and the data. The radio frequency circuit is configured to convert a baseband signal and a radio frequency signal, and process the radio frequency signal. The antenna is configured to send and receive the radio frequency signal in an electromagnetic wave form. The input/output apparatus, such as a touchscreen, a display screen, or a keyboard, is configured to receive data input by a user and output data to the user.

When data needs to be sent, the processor performs baseband processing on the to-be-sent data, and outputs the baseband signal to the radio frequency circuit. The radio frequency circuit performs radio frequency processing on the baseband signal and then sends the radio frequency signal to the outside through the antenna in form of electromagnetic wave. When data is sent to the radar detection device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 9 shows only one memory and one processor. In an actual radar detection product, there may be one or more processors and one or more memories. The memory may also be referred to as a storage medium, a storage device, or the like. The memory may be disposed independently of the processor, or may be integrated with the processor. This is not limited in this embodiment of this disclosure.

In this embodiment of this disclosure, the antenna and the radio frequency circuit that have a transceiver function may be considered as a transceiver unit of the radar detection device, and the processor having a processing function may be considered as a processing unit of the radar detection device.

As shown in FIG. 9, the radar detection device includes a transceiver unit 910 and a processing unit 920. The transceiver unit 910 may also be referred to as a transceiver, a transceiver machine, a transceiver apparatus, or the like. The processing unit 920 may also be referred to as a processor, a processing board, a processing module, a processing apparatus, or the like.

Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The transceiver unit may also be referred to as a transceiver machine, a transceiver, a transceiver circuit, or the like. The receiving unit may also be referred to as a receiver machine, a receiver, a receiver circuit, or the like. The sending unit may also be referred to as a transmitter machine, a transmitter, a transmitter circuit, or the like.

For example, in an implementation, the transceiver unit 910 is configured to perform the receiving operations performed by the radar detection device in FIG. 4. The processing unit 920 is configured to perform the processing operations performed by the radar detection device in FIG. 4.

It should be understood that FIG. 9 is merely an example rather than a limitation, and the radar detection device including the transceiver unit and the processing unit may not depend on the structure shown in FIG. 9.

When the detection apparatus 900 is a chip, the chip includes a transceiver unit and a processing unit. The transceiver unit may be an input/output circuit or a communication interface. The processing unit may be a processor, a microprocessor, or an integrated circuit integrated on the chip.

An embodiment of this disclosure further provides a computer-readable storage medium. The computer-readable storage medium stores a computer program used to implement the operations performed by the radar detection device in the foregoing method embodiments.

For example, when the computer program is executed by a computer, the computer is enabled to implement the operations performed by the radar detection device in the foregoing method embodiments.

An embodiment of this disclosure further provides a computer program product including instructions. The instructions are executed by a computer, so that the computer implements the operations performed by the radar detection device in the foregoing method embodiments.

An embodiment of this disclosure further provides a detection system. The system includes the radar detection apparatus in the foregoing embodiments of this disclosure and another sensor apparatus, or includes a radar detection apparatus and a processing apparatus, or includes a radar detection apparatus, a communication apparatus, and a processing apparatus. The detection system may be a device, and all apparatuses are located in the device and serve as functional modules of the device, or the detection system may include a plurality of devices, and the detection apparatus, the communication apparatus, and the like are located in different devices. For explanations and beneficial effects of related content of any detection apparatus provided above, refer to the corresponding method embodiment provided above, and details are not described herein again.

An embodiment of this disclosure further provides a radar system, configured to provide a detection function for a vehicle. The radar system includes at least one detection apparatus described in the foregoing embodiments of this disclosure. The at least one detection apparatus in the system may be integrated into an entire system or a device, or the at least one detection apparatus in the system may be independently disposed as an element or an apparatus.

An embodiment of this disclosure further provides a sensor system, configured to provide a detection function for a vehicle. The sensor system includes at least one detection apparatus described in the foregoing embodiments of this disclosure, and at least one of a camera, a laser radar, and other sensors. The at least one sensor apparatus in the system may be integrated into an entire system or a device, or the at least one sensor apparatus in the system may be independently disposed as an element or an apparatus.

An embodiment of this disclosure further provides a system applied to unmanned driving or intelligent driving. The system includes at least one of: a detection apparatus; a sensor such as a camera lens; and a fusion module that are described in the foregoing embodiments of this disclosure. The at least one apparatus in the system may be integrated into an entire system or a device, or the at least one apparatus in the system may be independently disposed as an element or an apparatus.

Further, any of the above systems may interact with a central controller of the vehicle to provide detection and/or fusion information for decision or control of driving of the vehicle.

An embodiment of this disclosure further provides a vehicle, for example, a smart car. The vehicle includes at least one detection apparatus or any one of the foregoing systems mentioned in the foregoing embodiments of this disclosure.

A specific structure of an execution body of the method provided in embodiments of this disclosure is not limited in embodiments of this disclosure, provided that a program that records code of the method provided in embodiments of this disclosure can be run to perform communication according to the foregoing method embodiments of this disclosure. For example, the execution body of the foregoing method embodiments of this disclosure may be a radar detection device or a functional module, that can invoke a program and execute the program, in a radar detection device.

Aspects or features of this disclosure may be implemented as a method, an apparatus or a product that uses standard programming and/or engineering technologies. The term "product" used in this specification may cover a computer program that can be accessed from any computer-readable component, carrier or medium. For example, a computer-readable medium may include but is not limited to: a magnetic storage device (e.g., a hard disk, a floppy disk, or a magnetic tape), an optical disc (e.g., a compact disc (CD) or a DIGITAL VERSATILE DISC (DVD)), a smart card, and a flash storage device (e.g., an erasable programmable ROM (EPROM), a card, a stick, or a key drive).

Various storage media described in this specification may indicate one or more devices and/or other machine-readable media that are configured to store information. The term "machine-readable media" may include but is not limited to a radio channel, and various other media that can store, include, and/or carry instructions and/or data.

It should be understood that, the processor in embodiments of this disclosure may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in embodiments of this disclosure may be a volatile memory or a nonvolatile memory, or may include a volatile memory and a nonvolatile memory. The nonvolatile memory may be a read-only memory (ROM), a programmable ROM (PROM), an EPROM, an electrically EPROM (EEPROM), or a flash memory. The volatile memory may be a random-access memory (RAM). For example, the RAM may be used as an external cache. By way of example but not limitation, the RAM may include the following plurality of forms: a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

It should be noted that when the processor is a general-purpose processor, a DSP, an ASIC, an FPGA, or another programmable logic device, a discrete gate or a transistor logic device, or a discrete hardware component, the memory (storage module) may be integrated into the processor.

It should be further noted that the memory described in this specification is intended to include, but is not limited to, these memories and any other memory of a suitable type.

A person of ordinary skill in the art may be aware that, in combination with the examples described in embodiments disclosed in this specification, units and steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this disclosure.

It may be clearly understood by a person skilled in the art that, for convenient and brief description, for a detailed working process of the foregoing apparatus and units, refer to a corresponding process in the foregoing method embodiments, and details are not described herein again.

In the several embodiments provided in this disclosure, it should be understood that the disclosed apparatus and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of this disclosure may be integrated into one unit, or each of the units may exist alone physically, or two or more units are integrated into one unit.

All or some of the foregoing embodiments may be implemented by using software, hardware, firmware, or any combination thereof. When software is used to implement embodiments, embodiments may be implemented completely or partially in a form of a computer program product. The computer program product includes one or more computer instructions. When the computer program instructions are loaded and executed on a computer, the procedures or functions according to embodiments of the present disclosure are all or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired e.g., a coaxial cable, an optical fiber, or a digital subscriber line (DSL)) or wireless (e.g., infrared, radio, or microwave) manner. The computer-readable storage medium may be any usable medium accessible by the computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state drive (SSD)), or the like. For example, the usable medium may include but is not limited to any medium that can store program code, such as a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:
   determining a first slope of an interfering signal;
   transmitting a first transmission signal using the first slope;
   receiving a first echo signal of the first transmission signal; and
   determining a parameter of the interfering signal based on the first echo signal.

2. The method of claim 1, wherein determining the first slope of the interfering signal comprises:
   transmitting a second transmission signal using a second slope different from the first slope;
   receiving a second echo signal of the second transmission signal;
   determining an interference duration of the interfering signal on the second transmission signal based on the second echo signal;
   determining a first candidate slope and a second candidate slope based on the interference duration;
   sending a third transmission signal using the first candidate slope;
   receiving a third echo signal of the third transmission signal; and
   further determining the first slope in the first candidate slope and the second candidate slope based on a feature of the third echo signal.

3. The method of claim 2, wherein the first transmission signal, the second transmission signal, and the third transmission signal are frequency-modulated continuous waves (FMCWs).

4. The method of claim 1, wherein determining the parameter of the interfering signal based on the first echo signal comprises:
   determining an interference duration of the interfering signal on the first transmission signal based on the first echo signal; and
   determining a bandwidth of the interfering signal based on the first slope and the interference duration.

5. The method of claim 4, further comprising adjusting a carrier of a to-be-transmitted signal based on the bandwidth.

6. The method of claim 1, wherein determining the parameter of the interfering signal based on the first echo signal comprises:
   determining a collision periodicity of the interfering signal and the first transmission signal based on the first echo signal; and determining a first periodicity of the interfering signal based on a second periodicity of the first transmission signal and the collision periodicity.

7. The method of claim 6, further comprising:
determining an interference duration of the interfering signal on the first transmission signal based on the first echo signal; and
adjusting a transmission time of a to-be-transmitted signal based on the first periodicity and the interference duration.

8. A detection apparatus comprising:
a memory configured to store instructions; and
a processor coupled to the memory and configured to execute the instructions to cause the detection apparatus to:
determine a first slope of an interfering signal;
transmit a first transmission signal using the first slope;
receive a first echo signal of the first transmission signal; and
determine a parameter of the interfering signal based on the first echo signal.

9. The detection apparatus of claim 8, wherein when executed by the processor, the instructions further cause the detection apparatus to:
transmit a second transmission signal using a second slope different from the first slope;
receive a second echo signal of the second transmission signal;
determine an interference duration of the interfering signal on the second transmission signal based on the second echo signal;
determine a first candidate slope and a second candidate slope based on the interference duration;
send a third transmission signal using the first candidate slope;
receive a third echo signal of the third transmission signal; and
further determine the first slope in the first candidate slope and the second candidate slope based on a feature of the third echo signal.

10. The detection apparatus of claim 9, wherein the first transmission signal, the second transmission signal, and the third transmission signal are frequency-modulated continuous waves (FMCWs).

11. The detection apparatus of claim 8, wherein when executed by the processor, the instructions further cause the detection apparatus to:
determine an interference duration of the interfering signal on the first transmission signal based on the first echo signal; and
determine a bandwidth of the interfering signal based on the first slope and the interference duration.

12. The detection apparatus of claim 11, wherein when executed by the processor, the instructions further cause the detection apparatus to adjust a carrier of a to-be-transmitted signal based on the bandwidth.

13. The detection apparatus of claim 8, wherein when executed by the processor, the instructions further cause the detection apparatus to:
determine a collision periodicity of the interfering signal and the first transmission signal based on the first echo signal; and
determine a first periodicity of the interfering signal based on a second periodicity of the first transmission signal and the collision periodicity.

14. The detection apparatus of claim 13, wherein when executed by the processor, the instructions further cause the detection apparatus to:
determine an interference duration of the interfering signal on the first transmission signal based on the first echo signal; and
adjust a transmission time of a to-be-transmitted signal based on the first periodicity and the interference duration.

15. A computer program product comprising computer-executable instructions that are stored on a non-transitory computer-readable medium and that, when executed by a processor, cause a detection apparatus to:
determine a first slope of an interfering signal;
transmit a first transmission signal using the first slope;
receive a first echo signal of the first transmission signal; and
determine a parameter of the interfering signal based on the first echo signal.

16. The computer program product of claim 15, wherein the computer-executable instructions further cause the detection apparatus to:
transmit a second transmission signal using a second slope different from the first slope;
receive a second echo signal of the second transmission signal;
determine an interference duration of the interfering signal on the second transmission signal based on the second echo signal;
determine a first candidate slope and a second candidate slope based on the interference duration;
send a third transmission signal using the first candidate slope;
receive a third echo signal of the third transmission signal; and
further determine the first slope in the first candidate slope and the second candidate slope based on a feature of the third echo signal.

17. The computer program product of claim 16, wherein the first transmission signal, the second transmission signal, and the third transmission signal are frequency-modulated continuous waves (FMCWs).

18. The computer program product of claim 15, wherein the computer-executable instructions further cause the detection apparatus to:
determine an interference duration of the interfering signal on the first transmission signal based on the first echo signal; and
determine a bandwidth of the interfering signal based on the first slope and the interference duration.

19. The computer program product of claim 18, wherein the computer-executable instructions further cause the detection apparatus to adjust a carrier of a to-be-transmitted signal based on the bandwidth.

20. The computer program product of claim 15, wherein the computer-executable instructions further cause the detection apparatus to:
determine a collision periodicity of the interfering signal and the first transmission signal based on the first echo signal;
determine a first periodicity of the interfering signal based on a second periodicity of the first transmission signal and the collision periodicity;
determine an interference duration of the interfering signal on the first transmission signal based on the first echo signal; and adjust a transmission time of a to-be-transmitted signal based on the first periodicity and the interference duration.

\* \* \* \* \*

UNITED STATES PATENT AND TRADEMARK OFFICE
CERTIFICATE OF CORRECTION

PATENT NO. : 12,204,043 B2
APPLICATION NO. : 17/827288
DATED : January 21, 2025
INVENTOR(S) : Leilei Xu and Boya Qin Page 1 of 1

It is certified that error appears in the above-identified patent and that said Letters Patent is hereby corrected as shown below:

On the Title Page

Page 2, (56) References Cited, Foreign Patent Documents: "IN 109738872 A 5/2019" should read "CN 109738872 A 5/2019"

Signed and Sealed this
Eighteenth Day of March, 2025

Coke Morgan Stewart
*Acting Director of the United States Patent and Trademark Office*